April 9, 1935.  M. J. CWELICH  1,997,485
HEATING ELEMENT
Filed March 28, 1934

Mathew J. Cwelich,
INVENTOR
BY Victor J. Evans & Co.
ATTORNEY

WITNESS
H. J. Meader

Patented Apr. 9, 1935

1,997,485

UNITED STATES PATENT OFFICE 1,997,485

HEATING ELEMENT

Mathew J. Cwelich, New York, N. Y.

Application March 28, 1934, Serial No. 717,820

1 Claim. (Cl. 219—43)

The invention relates to a heating element and more especially to a removable electric heating element for cooking utensils.

The primary object of the invention is the provision of a heating element of this character, wherein the same is in the form of a unit susceptible of being separably fitted to a cooking utensil, such as a coffee or tea pot, so that by the removal of the element the utensil can be more conveniently cleaned without damage to the heating element during this period.

Another object of the invention is the provision of a heating element of this character, wherein the make-up of the same is novel in form and can be conveniently and easily attached to or removed from the cooking utensil, it being especially constructed for adaptability to a water, coffee or tea pot.

A further object of the invention is the provision of a heating element of this character which is simple in construction, thoroughly reliable and efficient in its purpose, compact, strong, durable, and inexpensive to manufacture and install.

With these and other objects in view, the invention consists in the features of construction, combination and arrangement of parts as will be hereinafter more fully described in detail, illustrated in the accompanying drawing, which discloses the preferred embodiment of the invention, and pointed out in the claim hereunto appended.

In the accompanying drawing:

Figure 1 is a side elevation partly broken away of a coffee pot showing the heating element constructed in accordance with the invention in elevation and applied to the pot.

Figure 2 is a fragmentary transverse sectional view through the heating element.

Figure 3 is a sectional view on the line 3—3 of Figure 2 looking in the direction of the arrows.

Similar reference characters indicate corresponding parts throughout the several views in the drawing.

Referring to the drawing in detail, A designates generally a cooking utensil, in this instance indicative of a coffee pot, having the pouring spout 5 at one side and the handle 6 at the other side, the pot being formed with a unitary hollow base 7 in which is accommodated the heating element constituting the present invention and hereinafter fully described.

The heating element comprises an insulating block 8, preferably of circular form and housed within a casing including the body portion 9 and removable cover portion 10, respectively. The body and cover portions of the casing are separably united through the medium of a screw 11 which is passed centrally through the block 8 at the opening 12 provided in said block.

Counterseated within the block 8 is the electric heating coil 13 having the tine terminals 14 which are fitted within the extension 15 of the block 8 and these terminals are engageable by a plug socket 16 of conventional kind for the electric connection 17 with a source of current supply. The heating coil 13, next to one terminal 14, has associated therewith a removable fuse 18 which is accessible on removal of the cover section 10 from the body section 9 of the casing.

The body section 9 of the casing is formed with a hanger 19 cut therefrom and this hanger is engageable with a ledge 20 formed internally of the base 7 of the pot A, while diametrically opposite the hanger and formed with the body section 9 is a bolt barrel or housing 21 containing the spring tensioned latching or locking bolt 22 which also is adapted to engage with a keeper 23 internally of the base 7 of the pot A so that the heating element can be removably held within the said base 7 of the pot, as is clearly shown in Figure 1 of the drawing.

The latching or locking bolt has formed therewith a finger knob 24 which projects through a suitable clearance in the bottom of the barrel or housing 21 and is readily accessible to a person through the open bottom of the base 7, so that the heating element may be readily and easily released for its removal from the pot, particularly when cleaning the latter, or for other purposes.

What is claimed is:

The combination with a cooking utensil having a hollow portion at its bottom and opening therefrom, of a heating element for removable fitting in the hollow portion and comprising a circular insulating block, a casing encircling said block and having a removable cover portion, an electric resistance coil fitting said block and having terminal prongs extended without the casing, a ledge formed on the wall of the hollow portion of said utensil, a hanger cut from the casing and engageable with the ledge, and a locking bolt carried by the casing and engageable with the wall of the hollow portion of the utensil, the wall of the hollow portion of the utensil being cut away to provide a clearance for the terminal prongs.

MATHEW J. CWELICH.